United States Patent [19]

Lansbergen et al.

[11] Patent Number: 5,039,544

[45] Date of Patent: Aug. 13, 1991

[54] FAT COMPOSITION

[75] Inventors: Adrianus J. Lansbergen, Vlaardingen; Theodorus J. Liefkens, Maassluis; Nicolaas J. Verhoef, Maasland; Hendrik F. Zock, Barendrecht, all of Netherlands

[73] Assignee: Van den Bergh Foods Co., Division of Conopco Inc., Lisle, Ill.

[21] Appl. No.: 372,407

[22] Filed: Jun. 27, 1989

[30] Foreign Application Priority Data

Jun. 27, 1988 [GB] United Kingdom ................. 8815224

[51] Int. Cl.⁵ ............................................. A23D 9/00
[52] U.S. Cl. .................................. 426/611; 426/549; 426/553; 426/556; 426/601; 426/602; 426/603
[58] Field of Search ............... 426/601, 603, 606, 607, 426/611, 613, 804, 556, 549, 553, 551; 260/410, 410.6; 514/23, 552, 558; 536/119

[56] References Cited

U.S. PATENT DOCUMENTS

| | | | |
|---|---|---|---|
| 3,600,186 | 8/1971 | Mattson | 426/611 |
| 4,005,195 | 1/1977 | Jandacek | 424/180 |
| 4,005,196 | 1/1977 | Jandacek | 424/180 |
| 4,034,083 | 7/1977 | Mattson | 424/180 |
| 4,461,782 | 7/1984 | Robbins | 426/549 |
| 4,469,710 | 9/1984 | Rielley et al. | 426/541 |
| 4,611,055 | 9/1986 | Yamamato et al. | 536/119 |
| 4,835,001 | 5/1989 | Mijac et al. | 426/551 |
| 4,840,815 | 6/1989 | Meyer et al. | 426/611 |
| 4,880,657 | 11/1989 | Guffey et al. | 426/606 |

FOREIGN PATENT DOCUMENTS 233856 8/1987 European Pat. Off.
236288 9/1987 European Pat. Off.

*Primary Examiner*—Donald E. Czaja
*Assistant Examiner*—D. Workman
*Attorney, Agent, or Firm*—Gerard J. McGowan, Jr.

[57] ABSTRACT

A fatty composition comprising fat essentially consisting of a blend of one or more non-digestible polyol fatty acid polyesters and glyceride fat, wherein the fat comprises from 25% to 75% by weight of the polyol fatty acid polyesters, the blend of the polyesters having a slip melting point of between 35° and 50° C. and the fatty composition having an $S_{20}$ in the range of 400 to 1400 g. The fatty composition can advantageously be used in the preparation and baking of dough, in particular layered dough. Layered dough product prepared with the fatty composition display ample lift upon baking. Another aspect of the invention is the use of a fatty composition in the preparation of layered dough. Yet another aspect of the invention is a layered dough.

13 Claims, No Drawings

FAT COMPOSITION

BACKGROUND OF THE INVENTION

The present invention relates to a fatty composition, and in particular to a fatty composition in which part of the conventional triglyceride fat has been replaced by non-digestible polyol fatty acid polyester. The present invention is particularly concerned with a fatty composition for use in the preparation of puff pastry products, Danish pastry, croissants and the like. It further relates to a layered dough product containing a mixture of glyceride fat and polyol fatty acid polyester.

In the western world 30 to 50 % of the energy intake is due to the consumption of fats and oils. Of this amount about 40 % is consumed as 'visible' fat, such as butter, margarine, lard, shortening and edible oils. A considerable proportion of the 'visible' fats is introduced into the average diet by consumption of food products in which fat has been incorporated, such as pastries, biscuits, cakes, cream-fillings, and like products.

In view of the health hazards connected to obesity and unbalanced fat-intake there is a continuous interest in food products having a reduced caloric content. An attractive route to reduction of the caloric content in food products, such as in particular the above-referred-to bakery products and the fatty compositions such as margarines and shortenings used therefor, is replacement of conventional digestible fats and oils by non-digestible fat substitutes.

Polyol fatty acid polyesters, and in particular, the sugar fatty acid polyesters, such as e.g. the sucrose fatty acid polyesters, are known as suitable low-calorie fat-replacers in edible products. Substantially indigestible for human beings they have physical and organoleptic properties very similar to triglyceride oils and fats conventionally used in edible products. Polyol fatty acid polyesters are also reported to have use as pharmaceutical agents e.g. in view of their ability to take up fat-soluble substances, such as in particular cholesterol, in the gastro-intestinal tract, and subsequently remove those substances from the human body.

Edible fat-containing products comprising indigestible polyol fatty acid polyesters are known in the art, and described in e.g. U.S. Pat. Nos. 3,600,186, 4,005,195, 4,005,196, 4,034,083 and EP 0 233 856, and EP 0 235 836.

The application of sucrose polyesters in bakery products has been disclosed in U.S. Pat. No. 4,461,782. In this publication bakery products are disclosed comprising liquid sucrose polyesters in combination with sources of solid fatty acids and microcrystalline cellulose. The use of polyol fatty acid polyesters which are liquid at body temperature, are reported to give rise to the so-called problem of anal leakage. For this reason it is necessary to introduce considerable amounts of solids in the sucrose polyester phase by adding sufficiently solid fatty acids or a suitable source thereof. In the area of bakery margarines and products where solids profiles play an important and dominant role, the restrictions connected to the use of liquid sucrose polyesters and the necessary measures to reduce or eliminate the problem of anal leakage are formulation-wise undesirable.

In EP 0 236 288 a particular type of polyol polyesters which is partially liquid and partially solid at body temperature and the possible application thereof to baked products are described. This selection of polyol polyester is reported to avoid or reduce the problem of anal leakage.

However, when used to fully replace conventional fats in bakery margarines and products, polyol fatty acid polyesters of this type have been found to give unacceptable products and processing difficulties. In particular problems of sandy texture and stickiness during processing were encountered.

In EP-A 0 307 152 fat products are described which can be used in the preparation of dough compositions. According to the European application the fat products should have a penetration between 120 mm/10 and 350 mm/10 at 21° C. Dough prepared from fat products of the type described in EP 0 307 152, when used in the preparation of puff pastry and the like, exhibits insufficient lift upon baking.

SUMMARY OF THE INVENTION

It has now been found that fat products containing glyceride fat and non-digestible polyol fatty acid polyesters in a weight ratio ranging from about 1:3 to 3:1 can advantageously be employed in the preparation of bakery products, provided such fat products are relatively hard and contain indigestible polyesters having a slip melting point in the range of 35°–55° C.

Accordingly the present invention is concerned with a fatty composition comprising fat essentially consisting of a blend of one or more non-digestible polyol fatty acid polyesters and glyceride fat, wherein the fat comprises from 25% to 75% by weight of the polyol fatty acid polyesters, the blend of said polyesters having a slip melting point of between 35 and 55° C. and the fatty composition having an $S_{20}$ in the range of 400 to 1400 g. Here $S_{20}$ is a measure of the hardness of the product at a temperature of 20° C.

Surprisingly we have found that fatty compositions containing a substantial amount of relatively high melting polyol fatty acid polyesters, in particular when used in the preparation and baking of layered dough and the like, give good results, provided said fatty compositions are relatively hard. If fatty products, not meeting the hardness criterion mentioned above, are used in the preparation of layered dough products, after baking, products are obtained that show defects as a result of insufficient lift of the dough during baking.

Although we do not wish to be bound by theory it is believed that the hardness of the fatty compositions according to the invention has a large influence on the characteristics of the dough prepared therewith. In particular in layered dough, which is utilized in the production of baked goods such as puff pastry, the criticality of the hardness was found to be very pronounced.

The hardness value S at 20° C. ($S_{20}$) is determined by measuring the force (in grams) exerted by a sample when it is penetrated by a bar probe over a pre-set distance. The instrument used for such measurement is a Stevens-LFRA Texture Analyser provided with a stainless steel cylindrical probe having a diameter of 4.4 mm. The pretreatment of the samples includes tempering of said samples at a temperature of 15° C. during 3 days, followed by tempering at 20° C. for 24 hours. The penetration measurement should be carried out on a sample of relatively large volume (i.e. a sample of at least 100 gram).

The analytical instrument should be operated in its "Normal" mode using a penetration depth of 10 mm and a penetration rate of 2.0 mm/s. The penetration measurements should not b made within 2 cm of the sample's edge nor within 2.5 cm of each other. The S-value is obtained by calculating the mean figure for three penetration measurements.

It is an essential element of the present invention that the fat of the fatty composition is essentially composed of glyceride fat and polyol fatty acid polyesters. Full replacement of glyceride fat by polyol fatty acid polyesters results in a fatty composition which, when used in baking, will give unsatisfactory results.

A further essential feature of the fatty composition of the present invention is the selection of a suitable polyol fatty acid polyester or polyester blend on the basis of slip melting point. Suitable polyester blends have a slip melting point of between 35° and 55° C. If polyol fatty acid polyesters having a slip melting point below 35° C. are employed, the baked goods obtained display structural defects. Polyol fatty acid polyester having a slip melting point above 55° C. are not suitable as they have an adverse effect on the mouthfeel of baked goods. Preferably the blend of polyol fatty acid polyesters has a slip melting point of between 35° and 50° C. Most preferably the blend of polyesters in the present fatty composition has a slip melting point in the range of 38°-45° C.

DETAILED DESCRIPTION OF THE INVENTION

In this specification the term 'polyol' is intended to refer to any aliphatic or aromatic compound which comprises at least four free hydroxyl groups. Such polyols in particular include the group of sugar polyols, which comprises the sugars, i.e. the mono-, di- and polysaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and alpha-methylglucoside. A generally used and preferred sugar polyol is sucrose.

In this specification by 'non-digestible' is meant that at least about 70 % by weight of the material concerned is not digested by the human body.

In this specification, unless otherwise indicated, the term 'fat' refers to edible fats and oils consisting essentially of triglycerides, and which may be of animal, vegetable or synthetic origin. The terms fat and oil are used interchangeably.

Slip melting point can be conveniently defined as the temperature at which the amount of solid phase in a melting fat or fatty substance has become so low that an air bubble is forced upwards in an open capillary filled with the fat or fatty substance.

Polyol fatty acid polyesters have been defined in general chemical terms hereinbefore. Preferably, polyol fatty acid polyesters derived from sugars or sugar alcohols are applied, and in particular, sugar fatty acid polyesters derived from disaccharides, such as sucrose.

In general fatty acids per se or naturally occurring fats and oils may be used as source for the fatty acid residues in the polyol fatty acid polyesters. If necessary, conventional techniques may be used to provide the required slip melting points. Suitably such techniques include full or partial hydrogenation, interesterification, transesterification and/or fractionation, and may be used before or after conversion of the polyols to polyol fatty acid polyesters. Suitable sources of the fatty acid residues are vegetable oils and fats, such as in particular partially or fully hydrogenated palm oils, palm kernel oils and soybean oils.

Polyol fatty acid polyesters are applied of which, on an average, more than 70 % of the polyol hydroxyl groups have been esterified with fatty acids. Preferably polyol fatty acid polyesters are used with higher degrees of conversion, in particular polyol fatty acid polyesters of which, on an average, more than 85 % or even over 95 % of the polyol hydroxyl groups have been esterified with fatty acids.

Suitable glyceride oils and fats include, optionally modified by partial hydrogenation, interesterification and/or fractionation to provide the required melting characteristic, coconut oil, palm kernel oil, palm oil, butter fat, soybean oil, safflower oil, cotton seed oil, rapeseed oil, poppy seed oil, corn oil, sunflower oil, groundnut oil, marine oils and mixtures thereof.

The conventional glyceride oil is included in an amount of 25 to 75 % by weight of the fat. Weight ratios of the polyester component to the glyceride component preferably lie within the range of from 40:60 to 70:30, more preferably in the range of 40:60 to 60:40.

According to a preferred embodiment of the present invention, the fatty composition has an $S_{20}$ in the range 550 to 1350 g. In particular if the present fatty composition has a hardness at 20° C., measured as $S_{20}$, in the range of 625 to 1300 g, very good result can be obtained. Indeed baking results can be obtained that are at least as good as those obtained with high quality triglyceride-based fatty compositions.

The present invention relates to a fatty composition containing a substantial amount of fat. Preferably the fatty composition according to the present invention contains at least 50 wt.%, more preferably at least 75 wt.% of fat. The term fatty composition as used in this document, encompasses products such as shortenings, which essentially consist of fat, as well as, for instance, bakery margarines that contain a substantial amount of water.

The products according to the present invention can comprise up to 50% by weight of water, however, preferably contain up to 35% by weight of a water phase. According to a preferred embodiment the fatty composition according to the invention contains a continuous fat phase and a dispersed aqueous phase. More preferably, the weight ratio between the continuous fat-phase and the dispersed water phase lie within the range of 75:25 to 90:10.

We have found that good baking results are obtained with the present fatty composition if said composition has a particular solid profile. Preferably the solids profile of the present composition is such that the fat has an $N_{20}$-value in the range of 30–60, an $N_{35}$-value 5–20 and an $N_{40}$-value of less than 9.

At temperatures above 30° C., the blend of polyol fatty acid polyesters, preferably, contributes substantially to the solid fat present at said temperature. Accordingly, in a preferred embodiment, the blend of non-digestible polyol fatty acid polyesters has an $N_{30}$-value of more than 30. The glyceride fat present in the fatty composition according to the invention preferably has an $N_{20}$-value of less than 45, more preferably of less than 40.

The present fatty composition, preferably, has a yield point of at least 1000 Pa. More preferably the yield point of the fatty composition is at least 10,000 Pa at 21°

C. The yield point may be determined by means of the method described in EP-A 0 307 152.

The fatty composition according to the present invention may comprise in addition to polyol fatty acid polyesters, glyceride fat and water, minor ingredients conventionally found in bakery-margarine compositions, including anti-oxidants, such as naturally present or added tocopherols, butylated hydroxytoluene, -anisole or -quinone, food grade acids such as citric acid and ascorbic acid, flavouring agents, taste enhancers, vitamins, such as in particular the fat-soluble vitamins, proteins, butter- or skim milk, salt, emulsifiers, such as mono- or di-glycerides, lecithin, and the like.

Another aspect of the present invention is the use of a fatty composition according to the invention in the preparation of layered dough. The fatty composition according to the invention offers the advantage that a high quality dough can be prepared therefrom without the need of (repeatedly) cooling the dough during preparation. Accordingly, in a preferred embodiment, the use of the present invention in the preparation of a layered dough does not involve cooling of the dough.

By the term layered dough as used here is meant a dough having a flaky structure and containing a plurality of discrete fat-layers. Although we do not wish to be bound by theory, it is believed that these fat layers constitute barriers for gas developed during baking and, in combination with the presence of water and flour, form a prerequisite for the formation of an airy structure upon baking of the dough. The fat layers in the dough structure are essentially impervious to water vapour generated during baking. Thus the water vapour generated during baking, accumulates under such fat layers. The accumulated water vapour exerts a pressure on the surrounding dough structure, resulting in expansion and separation of layers, i.e. lift of the dough.

The present invention also encompasses layered doughs that gain lift from carbon dioxide generated from chemical and/or yeast leavening agents. Examples of layered doughs in which frequently yeast and/or baking powder are incorporated are Danish pastry and croissant.

Layered dough may be prepared by several method known in the art. All these methods have in common that they yield a dough containing flour, water and discrete fat layers. The process of preparing layered dough often involves repeated folding and rolling out of the dough.

Yet another aspect of the present invention is a layered dough comprising:
(a) 10 to 45 wt.% of fat essentially consisting of glyceride fat and a blend of one or more polyol fatty acid polyesters, the blend of said polyesters constituting at least 40 wt.% of the fat and having a slip melting point of between 35° and 55° C.,
(b) 25 to 75 wt.% flour and (c) 10 to 30 wt.% water.

According to a preferred embodiment of the present invention the layered dough contains 10 to 45 wt.% of fat originating from a fatty composition according to the invention. Most preferably the layered dough contains 15 to 40 wt.% of fat originating the present fatty composition. The blend of polyol fatty acid polyesters present in the fat, preferably, has a slip melting point of between 35° and 50° C.

Layered doughs according to the present invention offer the advantage that baked goods obtained therefrom exhibit a regular shape and relatively little shrinkage (i.e. percentage reduction in top surface area observed during baking). The baking performance of the layered dough according to the invention was found to be relatively independent of the oven temperature. The present layered dough can suitably be used in the preparation of baked goods both in industrial ovens and in conventional household ovens which normally are operated at relatively low temperatures. Also the water level utilized in the present layered dough was found to be less critical than in doughs that are fully based on triglyceride fat.

Layered dough according to the present invention further offers the advantage that, when stored in a frozen state for a relatively long period of time, it still produces excellent pastry products upon baking. The baked goods obtained from such dough have a very good structure and exhibit sufficient lift upon baking even if the dough has been stored for 12 months or more. According to a preferred embodiment the present invention is concerned with a frozen layered dough.

The layered dough according to the invention can suitably contain several ingredients known in the art, such as chemical leavening agents (e.g. baking powder), yeast leavening agent, egg, salt, sugar, flavouring, syrup etc.

The invention is further illustrated by means of a number of examples. In these examples sucrose fatty acid polyester of different composition are referred to. The precise composition of these sucrose polyesters (SPE's) is as follows:
SPE1: fatty acid residues derived from 55% fully hardened soybean oil, slip melting point 65° C., and 45% touch-hardened soybean oil, slip melting point 28° C.; degree of esterification over 95%
SPE2 : fatty acid residues derived from soybean oil; degree of esterification over 95%
SPE3 : fatty acid residues derived from 62% fully hardened palm kernel oil, slip melting point 39° C., and 38% fully hardened palm oil (slip melting point 58° C.); degree of esterification over 95%
SPE4 : fatty acid residues derived from palm oil hardened to a slip melting point of 44° C.
SPE5 : fatty acid residues derived from 53% fully hardened palm kernel oil, slip melting point 39° C., and 47% fully hardened palm oil (slip melting point 58° C.); degree of esterification over 95%
SPE6 : fatty acid residues derived from 62% fully hardened soybean oil, slip melting point 65° C., and 38% touch-hardened soybean oil, slip melting point 28° C.; degree of esterification over 95%

The $N_{30}$-value of the sucrose polyesters as well as the slip melting point thereof are recited in the table below:

| Sucrose Polyester | $N_{30}$ | Slip melting point |
|---|---|---|
| SPE1 | 40 | 42° C. |
| SPE2 | 0 | — |
| SPE3 | 33 | 36° C. |
| SPE4 | 17 | 34° C. |
| SPE5 | 55 | 38° C. |
| SPE6 | 62 | 46° C. |

EXAMPLE 1

A puff-pastry margarine 1A was prepared having the following formulation:

| ingredient | % by weight |
| --- | --- |
| fat phase | 82.7 |
| monoglyceride[1] | 0.2 |
| salt | 1.0 |
| minor ingredients[2] | 0.2 |
| water | balance |
| pH | 4.5 |

[1]Admul 6203 TM (ex. Unimills, Zwijndrecht, the Netherlands)
[2]flavouring and colouring agent The composition of the fat phase was as follows:

| ingredient | % by weight of the fat phase |
| --- | --- |
| soybean oil | 13.0 |
| palm oil | 10.0 |
| partially hardened palm oil (slip melting point 44° C.) | 17.0 |
| SPE1 | 60.0 |

The N-values of the fat phase at 20°, 35° and 40° C. were 41, 12 and 4 respectively.

The margarine was prepared on micro-scale (2.5–3 kg/hr) by admixing the separately prepared aqueous phase and fat phase in a pre-emulsion vessel and subsequently passing the pre-emulsion, having a temperature of about 55° C., through two scraped surface heat exchangers (A-unit) and a resting tube (B-unit). The processing conditions employed were as follows:

| Unit | A-unit | A-unit | B-unit |
| --- | --- | --- | --- |
| Rotation speed | 1000 rpm | 800 rpm | — |
| Jacket temperature | −8° C. | 22° C. | — |
| Exit temperature | 20° C. | 26° C. | 25° C. |
| Solid fat content | 29% | 22% | 23% |

The product so obtained appeared to have an $S_{20}$ value of 700 g.

A layered dough was prepared from the following ingredients:

| | |
| --- | --- |
| Flour (Banket Extra, Wessanen, the Netherlands) | 1000 g |
| Water | 520 g |
| Predough margarine[1] | 200 g |
| Puff pastry margarine 1A | 800 g |

[1]Trio TM Cake margarine (ex. van den Bergh & Jurgens, Rotterdam, the Netherlands); N-line: $N_{15}$ = 48, $N_{20}$ = 35, $N_{25}$ = 23, $N_{30}$ = 11, $N_{35}$ = 3 margarine containing: 81.5 wt. % fat, 0.05 wt. % monoglycerides, 0.4 wt. % lecithin, 1 wt. % salt and water The dough was prepared using the French method described by E. A. McGill in "The Bakers Digest" (February 1975), pages 28–34. The paste obtained by admixture of the pre-dough and other ingredients was laminated and sheeted on a conventional dough brake (Rondo) using small thickness reduction steps (30→25→22→20→15→12→10 mm). The pastes were given six half turns (equivalent to 729 fat layers). Between each two half-turns, the laminates were allowed to rest for 45 minutes at 20° C. (covered by a sheet to prevent drying out).

The laminate was rolled out to a final thickness of 4 mm. Round patties (patty shells; vol-au-vents) having a diameter of 80 mm, were cut out from the dough and a relaxation period of 45 minutes was employed before baking. The patties were baked at 230° C. for 20 minutes. After cooling down patty height, the gravity index and shrinkage were measured and the internal structure was assessed. The gravity index whenever referred to in here is the ratio of the average height and weight of the baked patties.

The height of the patties and gravity index so obtained was measured and found to be 37 mm and 1.26 mm/g respectively. The patty height figure and gravity index given here and in the other examples are obtained by averaging the figures found for at least 8 patties.

EXAMPLE 2

Puff pastry margarines were prepared in a similar manner as described in Example 1. The concentration levels of the product ingredients employed were identical to those recited in Example 1 except that the margarine contained 0.15 wt.% monoglycerides and with the exception that the fat phase composition was changed. The composition of the fat phase of these margarine products was as follows:

| Margarine | 2A | 2B | 2C |
| --- | --- | --- | --- |
| SPE1 | 50 | 45 | 60 |
| SPE2 | | 5 | |
| Soybean oil | 16 | 16 | 13 |
| Partially hardened palm oil (slip melting point 45° C.) | 19 | 19 | 15 |
| Palm oil | 6 | 6 | 5 |
| Partially hardened rape seed oil (slip melting point 28° C.) | 6 | 6 | 5 |
| Partially hardened rape seed oil (slip melting point 43° C.) | 3 | 3 | 2 |

The N-values of the fat phase at 20°, 35° and 40° C. and the $S_{20}$ value of the margarine product are recited below:

| Margarine | 2A | 2B | 2C |
| --- | --- | --- | --- |
| $N_{20}$ | 38 | 35 | 41 |
| $N_{35}$ | 11 | 9 | 12 |
| $N_{40}$ | 3 | 3 | 4 |
| $S_{20}$ (in g) | 700 | 590 | 740 |

Puff pastry dough was prepared by using the French method as in Example 1 and using the same ingredients as mentioned in said example with the exception that instead of Margarine 1A, respectively Margarine 2A, 2B and 2C were utilized. The dough was pre-shaped to form patties and was baked under the same conditions as described in example 1, after which the height and gravity index of the patties obtained was determined. The following results were obtained:

| Dough prepared with margarine | 2A | 2B | 2C |
| --- | --- | --- | --- |
| Patty height in mm | 34 | 33 | 37 |
| Gravity index in mm/g | 1.11 | 1.10 | 1.26 |

EXAMPLE 3

Puff pastry margarines were prepared in a similar manner as described in Example 2 using the same ingredients with the exception of the fat phase. The composition of the fat phase of these margarine products was as follows:

| Margarine | 3A | 3B | 3C | 3D | 3Z |
| --- | --- | --- | --- | --- | --- |
| SPE1 | 60 | 40 | 30 | 30 | 30 |

-continued

| Margarine | 3A | 3B | 3C | 3D | 3Z |
|---|---|---|---|---|---|
| SPE3 | | 20 | 30 | 30 | |
| SPE4 | | | | | 30 |
| Partially hardened palm oil (slip melting point 44° C.) | 15 | 16 | 16 | 10 | 10 |
| Sunflower oil | 13 | 24 | 24 | 30 | 30 |
| Palm oil | 5 | | | | |
| Hardened rapeseed oil (slip melting point 28° C.) | 5 | | | | |
| Hardened rape seed oil (slip melting point 43) | 2 | | | | |

The N-values of the fat phase at 20°, 35° and 40° C. and the $S_{20}$ value of the margarine product are recited below:

| Margarine | 3A | 3B | 3C | 3D | 3Z |
|---|---|---|---|---|---|
| $N_{20}$ | 41 | 37 | 40 | 34 | 30 |
| $N_{35}$ | 11 | 8 | 6 | 5 | 5 |
| $N_{40}$ | 5 | 2 | 1 | 1 | 1 |
| $S_{20}$ (in g) | 620 | 520 | 560 | 470 | 280 |

Pastry dough was prepared from the same ingredients as mentioned in Example 1, with the exception that instead of Margarine 1A respectively Margarine 3A, 3B, 3C, 3D and 3Z were utilized. The dough was prepared in a manner identical to that described in Example 2 and baked under the same conditions as described in said Example. Again the patty height and gravity index of the baked patties was determined:

| Margarine | 3A | 3B | 3C | 3D | 3Z |
|---|---|---|---|---|---|
| Patty height | 32 | 29 | 29 | 28 | 25 |
| Gravity index | 1.04 | 0.95 | 0.88 | 0.90 | 0.85 |

Using the same ingredients (except that the flour used was a stronger flour; Columbus TM, ex. Meneba, Rotterdam, the Netherlands) puff pastry dough was prepared from margarines 3A, 3B, 3C, 3D and 3Z, in the same manner as described in Example 1. Baked patties were obtained by using the same procedure described above. The patty heights and gravity indices so obtained were as follows:

| Margarine | 3A | 3B | 3C | 3D | 3Z |
|---|---|---|---|---|---|
| Patty height | 46 | 47 | 45 | 43 | 39 |
| Gravity index | 1.32 | 1.31 | 1.27 | 1.25 | 1.12 |

EXAMPLE 4

Example 3 was repeated using the following fat phase compositions:

| Margarine | 4A | 4B | 4C | 4D | 4Z |
|---|---|---|---|---|---|
| SPE1 | 60 | 40 | 30 | 20 | |
| SPE5 | | 20 | 30 | 40 | 60 |
| Sunflower oil | 13 | 13 | 13 | 13 | 13 |
| Palm oil hardened to a slip melting point of 44° C. | 15 | 15 | 15 | 15 | 15 |
| Palm oil | 5 | 5 | 5 | 5 | 5 |
| Hardened rapeseed oil (slip melting point 28° C.) | 5 | 5 | 5 | 5 | 5 |
| Hardened rape seed oil (slip melting point 43° C.) | 2 | 2 | 2 | 2 | 2 |

The N-values of the fat phase at 20°, 35° and 40° C. and the $S_{20}$ value of the margarine product are recited below:

| Margarine | 4A | 4B | 4C | 4D | 4Z |
|---|---|---|---|---|---|
| $N_{20}$ | 41 | 45 | 49 | 53 | 61 |
| $N_{35}$ | 14 | 11 | 10 | 9 | 7 |
| $N_{40}$ | 5 | 3 | 1 | 0 | 0 |
| $S_{20}$ (in g) | 670 | 690 | 830 | 890 | 1450 |

Pastry dough was prepared and baked using the French method as described in Example 3. The patty heights and gravity indices of the baked products were found to be as follows:

| Margarine | 4A | 4B | 4C | 4D | 4Z |
|---|---|---|---|---|---|
| Patty height | 34 | 39 | 40 | 42 | 29 |
| Gravity index | 1.09 | 1.18 | 1.32 | 1.31 | 0.97 |

EXAMPLE 5

Example 3 was repeated using the following fat phase compositions:

| Margarine | 5A | 5B | 5C | 5D | 5E |
|---|---|---|---|---|---|
| SPE1 | 60 | 40 | 30 | 20 | |
| SPE3 | | 20 | 30 | 40 | 60 |
| Sunflower oil | 13 | 13 | 13 | 13 | 13 |
| Palm oil hardened to a slip melting point of 44° C. | 15 | 15 | 15 | 15 | 15 |
| Palm oil | 5 | 5 | 5 | 5 | 5 |
| Hardened rapeseed oil (slip melting point 28° C.) | 5 | 5 | 5 | 5 | 5 |
| Hardened rape seed oil (slip melting point 43° C.) | 2 | 2 | 2 | 2 | 2 |

The N-values of the fat phase at 20°, 35° and 40° C. and the $S_{20}$ value of the margarine product are recited below:

| Margarine | 5A | 5B | 5C | 5D | 5E |
|---|---|---|---|---|---|
| $N_{20}$ | 41 | 43 | 46 | 48 | 56 |
| $N_{35}$ | 14 | 10 | 7 | 5 | 0 |
| $N_{40}$ | 5 | 2 | 1 | 0 | 0 |
| $S_{20}$ (in g) | 700 | 660 | 760 | 750 | 1090 |

Pastry dough was prepared and baked using the French method as described in Example 1. The patty heights and the gravity indices of the baked products were determined:

| Margarine | 5A | 5B | 5C | 5D | 5E |
|---|---|---|---|---|---|
| Patty height | 36 | 39 | 40 | 39 | 37 |
| Gravity index | 1.13 | 1.22 | 1.23 | 1.19 | 1.23 |

Using the same ingredients puff pastry dough was prepared from margarines 5A, 5B, 5C, 5D and 5E, utilizing the Scotch method described by E. A. McGill in "The Bakers Digest" (February 1975), pages 28-34. The dough was sheeted on a conventional dough brake (Rondo) using small thickness reduction steps. The pastes were given 3 half-turns (threefold turn) without resting time. The laminate was rolled out to a final thickness of 3.75 mm. The patties were cut out and a relaxation period of 30 minutes was employed before baking. Baking conditions employed and evaluation techniques used were identical to those recited in Example 1. The patty heights and gravity indices so obtained were as follows:

| Margarine | 5A | 5B | 5C | 5D | 5E |
|---|---|---|---|---|---|
| Patty height | 40 | 40 | 41 | 45 | 39 |
| Gravity index | 1.07 | 1.25 | 1.21 | 1.52 | 1.24 |

EXAMPLE 6

Example 3 was repeated using the following at phase compositions:

| Margarine | 6A | 6B | 6C | 6D | 6E |
|---|---|---|---|---|---|
| SPE1 | 60 | | | | |
| SPE5 | | | 20 | 30 | 40 |
| SPE6 | | 60 | 40 | 30 | 20 |
| Sunflower oil | 13 | 13 | 13 | 13 | 13 |
| Palm oil hardened to a slip melting point of 44° C. | 15 | 15 | 15 | 15 | 15 |
| Palm oil | 5 | 5 | 5 | 5 | 5 |
| Hardened rapeseed oil (slip melting point 28° C.) | 5 | 5 | 5 | 5 | 5 |
| Hardened rape seed oil (slip melting point 43° C.) | 2 | 2 | 2 | 2 | 2 |

The N-value of the fat phase at 20°, 35° and 40° C. and the $S_{20}$ value of the margarine product are recited below:

| Margarine | 6A | 6B | 6C | 6D | 6E |
|---|---|---|---|---|---|
| $N_{20}$ | 51 | 44 | 53 | 55 | 56 |
| $N_{35}$ | 24 | 17 | 19 | 16 | 13 |
| $N_{40}$ | 13 | 7 | 8 | 5 | 3 |
| $S_{20}$ (in g) | 680 | 920 | 890 | 1030 | 1200 |

Pastry dough was prepared and baked using the French method as described in Example 3. The patty heights and gravity indices of the baked products were determined:

| Margarine | 6A | 6B | 6C | 6D | 6E |
|---|---|---|---|---|---|
| Patty height | 36 | 40 | 42 | 41 | 42 |
| Gravity index | 1.21 | 1.36 | 1.46 | 1.39 | 1.42 |

EXAMPLE 7

Three margarine products of the same composition as Margarine 6A, with the exception that the monoglyceride level was varied, were prepared in the a similar manner as described in Example 6. The monoglyceride levels employed were 0.15%, 0.07% and 0% by weight of product. Dough was prepared from the margarine products as in Example 6 and the patty heights were measured after baking. No significant differences in patty height were observed.

EXAMPLE 8

A shortening was prepared from the following ingredients:

| Ingredients | wt. % |
|---|---|
| SPE1 | 59.7 |
| Soybean oil | 13.0 |
| Partially hardened palm oil (slip melting point 45° C.) | 14.8 |
| Palm oil | 5.0 |
| Partially hardened rape seed oil (slip melting point 28° C.) | 4.6 |
| Partially hardened rape seed oil (slip melting point 43° C.) | 2.6 |
| Monoglycerides (Admul 6203) | 0.15 |
| Colouring and flavouring | 0.15 |

The shortening was prepared using similar processing conditions as described in example 1, with the exception that the solid fat content of the fat blend after the two subsequent A-units and B-unit was 32%, 29% and 31% respectively.

The N-values of the fat phase of the shortening at several temperatures were found to be as follows:

| $N_{10}$ | $N_{15}$ | $N_{20}$ | $N_{25}$ | $N_{30}$ | $N_{35}$ | $N_{40}$ | $N_{45}$ |
|---|---|---|---|---|---|---|---|
| 59 | 52 | 44 | 35 | 26 | 16 | 7 | 0 |

The $S_{20}$ was found to be 416 g.

The shortening so obtained was used in an industrial French method of puff pastry production (6×5×4). Doughs were produced using pastry flour (Banket Extra ™) and a strong wheat flour (Columbus ™).

The dough composition was as follows:

| Wheat flour | 1000 g |
|---|---|
| Shortening of example 8[1] | 750 g |
| Water | 480 g[2] or 530 g[3] |

[1] 100 g used in preparation of pre-dough
[2] in case of pastry flour
[3] in case of strong flour The doughs were used to prepare patty shell pieces. A number of the dough pieces were baked at 240° C. for 20 minutes. The remaining dough pieces were frozen and stored for 2 weeks at −20° C. After storage the dough pieces were thawn for 30 minutes at 20° C. and baked at 240° C. for 20 minutes. The following results were obtained:

| Type of wheat flour | Fresh dough | | Frozen dough | |
|---|---|---|---|---|
| | Gravity Index | Shrinkage in % | Gravity Index | Shrinkage in % |
| Pastry flour | 1.34 | 17 | 1.36 | 18 |
| Strong flour | 1.57 | 21 | 1.53 | 27 |

These figures show that the leavening of the dough is not substantially affected by frozen storage of said dough. Furthermore the type of wheat flour utilized appears to have a large influence on both the leavening and shrinkage observed.

EXAMPLE 9

A margarine 9A of identical composition as Margarine 3A, but prepared on pilot plant scale, was cut in 1 ml cubes and used to produce puff pastry dough by means of the Scotch method described hereinbefore. An industrial lamination method with 3 layering steps, resulting in a laminate containing 120 dough layers, was used (6×5×4). A reference dough was prepared from a commercially available high quality puff pastry margarine product (100% triglyceride fat; Trio ™ Korst, ex. van den Bergh & Jurgens, Rotterdam, the Netherlands).

The composition of dough products prepared in the above manner, containing different levels of water, was as follows:

| Pastry flour (Banket extra ™) | 1000 g |
| Margarine 9A / Trio Korst ™ [1] | 900 g |
| Water | 440, 460, 480, 500, 520 g |

[1] 100 g used in the preparation of the pre-dough

These doughs were used to prepare (pre-shaped) patty shell dough pieces which were frozen and stored at −30° C. for a month. Then the dough pieces were thawn for 30 minutes at 20° C. and baked at 240° C. for 20 minutes. The results of the experiments are summarized in the following table:

| | Margarine 9A | | Trio ™ Korst | |
|---|---|---|---|---|
| Water content (in g) | Gravity Index | Shrinkage in % | Gravity Index | Shrinkage in % |
| 440 | 1.30 | 26 | 1.33 | 35 |
| 460 | 1.22 | 25 | 1.34 | 32 |
| 480 | 1.25 | 25 | 1.54 | 38 |
| 500 | 1.27 | 26 | 1.58 | 36 |
| 520 | 1.21 | 22 | 1.39 | 34 |

From these figures it can be concluded that the shrinkage observed for margarine 9A is substantially less than the shrinkage observed for the commercial triglyceride margarine. Furthermore the gravity indices found for the baked products obtained with margarine 9A appear to vary less with the water content of the original dough than the corresponding baked products obtained with the commercial product.

EXAMPLE 10

Example 9 was repeated with the exception that the water content used was fixed on 520 g, no pre-dough margarine was employed and that laminates comprising varying numbers of dough layers were prepared. The flaky pastry doughs prepared, contained 1, 3, 9, 27 and 81 layers respectively.

The result obtained after baking were as follows:

| | Margarine 10A | | Trio ™ Korst | |
|---|---|---|---|---|
| Number of layers | Gravity Index | Shrinkage in % | Gravity Index | Shrinkage in % |
| 1 | 0.93 | 20 | 0.95 | 23 |
| 3 | 1.19 | 27 | 1.14 | 28 |
| 9 | 1.29 | 30 | 1.30 | 32 |
| 27 | 1.36 | 25 | 1.49 | 35 |
| 81 | 1.44 | 23 | 1.46 | 37 |

These figures show that the shrinkage observed for Margarine 10A is substantially less than that observed for the commercial triglyceride margarine. Furthermore, as regards lift, margarine 10A appears to match the commercial product.

EXAMPLE 11

Example 9 was repeated with the exception that the water content used was fixed on 520 g and that no triglyceride margarine was tested. The dough obtained was used to prepare patty shell dough pieces which were baked fresh and after frozen storage at −20° C. Both freshly prepared dough products and dough products having been stored for 4 months were baked. The baking conditions employed were 180° C. (30 min.), 210° C. (23 min.) and 240° C. (20 min.).

The results of the baking tests of the fresh dough product and the stored frozen product are summarized below:

| Baking temperature | 180° C. | 210° C. | 240° C. |
|---|---|---|---|
| Gravity Index (Fresh) | 1.40 | 1.45 | 1.46 |
| Gravity Index (Stored for 4 months) | 1.32 | 1.48 | 1.51 |

These results show that dough products prepared from fatty compositions according to the present invention can suitably be frozen and stored at low temperatures for prolonged periods of time without a substantial adverse influence on the dough quality. The influence of the baking temperature on the quality of the baked good was found to be relatively low.

EXAMPLE 12

From a Margarine 12A of identical composition as Margarine 3A, but prepared on pilot plant scale, a puff pastry dough was prepared using the French method described hereinbefore. An industrial lamination method with 3 layering steps, resulting in a laminate containing 120 dough layers, was used (6×5×4). A reference dough was prepared from a commercially available high quality puff pastry margarine product (Trio ™ Korst).

The composition of dough products prepared in the above manner, was as follows:

| Wheat flour[1] | 1000 g |
| Margarine 12A / Trio Korst ™ [2] | 900 g |
| Water | 520 g |

[1] two different types of wheat flour were used namely: Banket extra ™ and Columbus ™
[2] 100 g used in the preparation of the pre-dough The doughs obtained were used to prepare patty shell dough pieces. A number of dough pieces was baked at 240° C. for 20 minutes, the remaining dough pieces were frozen and stored for two weeks at −20° C. After storage the dough pieces were thawn for 30 minutes at 20° C. and baked at 240° C. for 20 minutes. The results obtained for margarine 12A are summarized in the following table:

| | Fresh dough | | Frozen dough | |
|---|---|---|---|---|
| Type of wheat flour | Gravity Index | Shrinkage in % | Gravity Index | Shrinkage in % |
| Banket extra ™ | 1.45 | 13 | 1.36 | 11 |
| Columbus ™ | 1.73 | 18 | 1.53 | 25 |

From these figures it can be concluded that the leavening of the dough is slightly affected by frozen storage of said dough. The effect of frozen storage on the gravity index and shrinkage were found to be less pronounced than the effect found for the doughs prepared from the commercial triglyceride margarine. Furthermore the type of wheat flour utilized appears to have a large influence on both the leavening and shrinkage observed.

What is claimed is:

1. Fatty composition comprising fat essentially consisting of a blend of one or more non-digestible polyol fatty acid polyesters and glyceride fat, wherein the fat comprises from 25% to 75% by weight of the polyol fatty acid polyesters, the blend of said polyesters having a slip melting point of between 35° and 50° C. and the fatty composition having an $S_{20}$ in the range of 400 to 1400 g.

2. Fatty composition according to claim 1, wherein the composition has an $S_{20}$ in the range of 550 to 1350 g.

3. Fatty composition according to claim 2, wherein the composition has an $S_{20}$ in the range of 625 to 1300 g.

4. Fatty composition according to claim 1, wherein the composition contains at least 50 wt.%, of fat.

5. Fatty composition according to claim 4, wherein the composition contains a continuous fat phase and a dispersed aqueous phase.

6. Fatty composition according to claim 1, wherein the fat has an $N_{20}$-value in the range of 30–60, an $N_{35}$-value 5–20 and an $N_{40}$-value of less than 9.

7. Fatty composition according to claim 1, wherein the blend of non-digestible polyol fatty acid polyesters has an $N_{30}$-value of more than 30.

8. Fatty composition according to claim 1, wherein the glyceride fat has an $N_{20}$-value of less than 45.

9. A method of preparing a layered dough comprising the addition of the fatty composition of claim 1 to the dough.

10. The method of claim 9, wherein the preparation of the layered dough does not involve cooling of the dough.

11. Layered dough according to claim 13, wherein the dough is frozen.

12. The fatty composition according to claim 4 wherein the composition contains at least 75 wt. % of fat.

13. A layered dough comprising:
(a) 10 to 45 wt.% of a fat originating from a fatty composition comprising fat essentially consisting of a blend of one or more non-digestible polyol fatty acid polyesters and glyceride fat, wherein the fat comprises from 40 to 75% by weight of the polyol fatty acid polyesters, the blend of said polyesters having a slip melting point of between 35° and 50° C. and the fatty composition having an $S_{20}$ in the range of 400 to 1400 g.
(b) 25 to 75 wt.% flour and
(c) 10 to 30 l wt% water.

* * * * *